April 6, 1948.  W. C. JOHNSON  2,439,305
MACHINE FOR BRUSHING AND CLEANING PLATES
Filed June 22, 1944  3 Sheets-Sheet 3
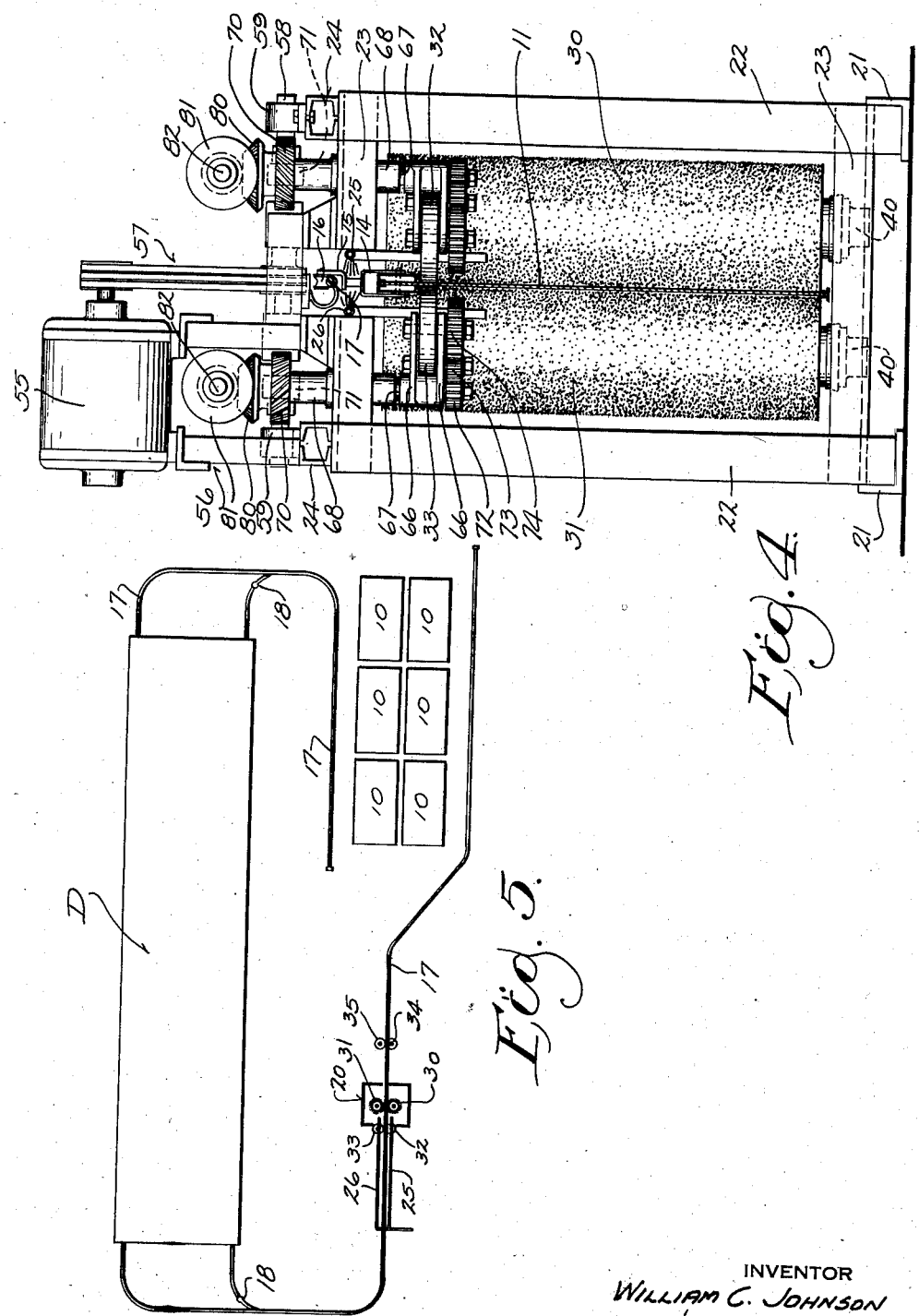
INVENTOR
WILLIAM C. JOHNSON
BY
ATTORNEY

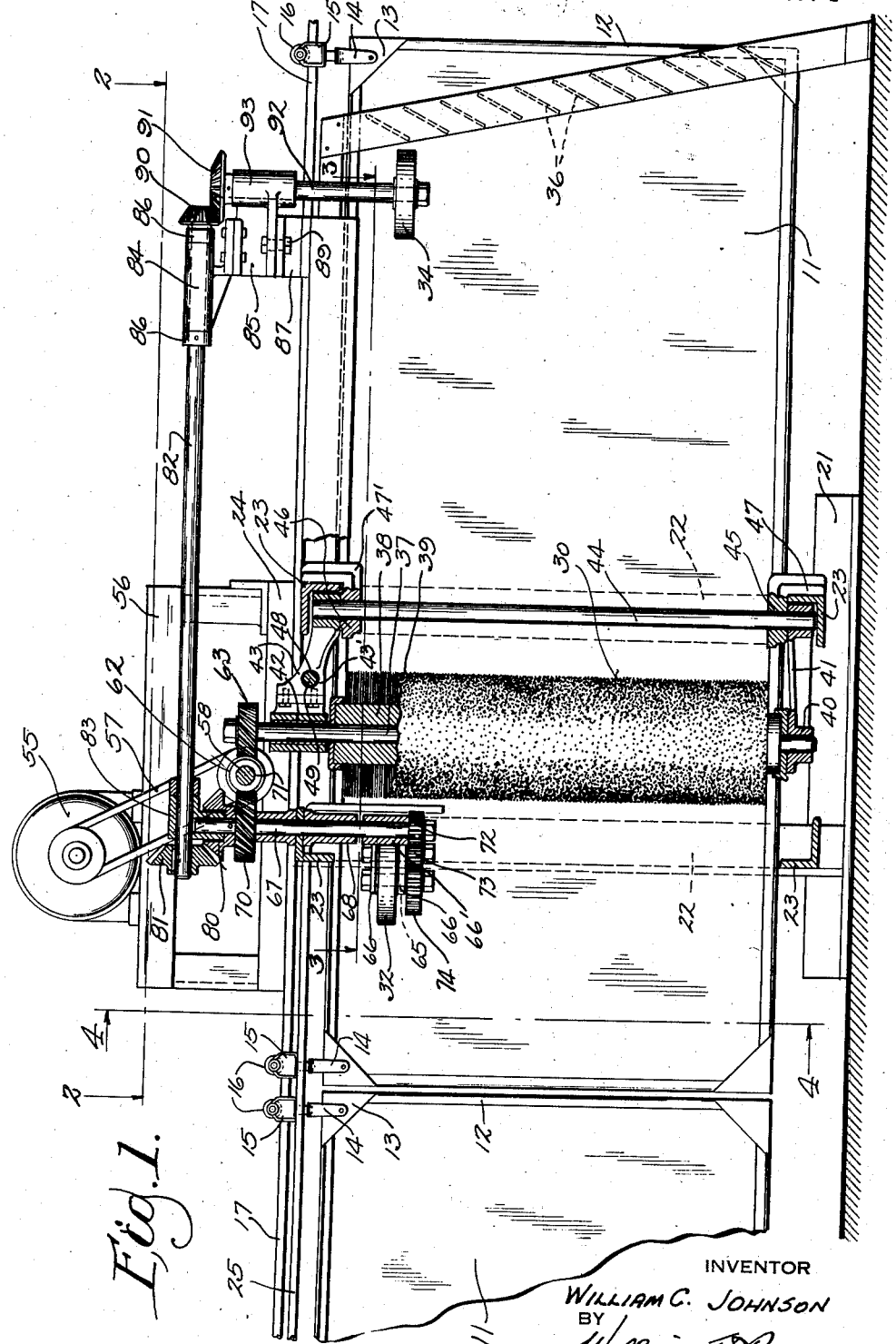

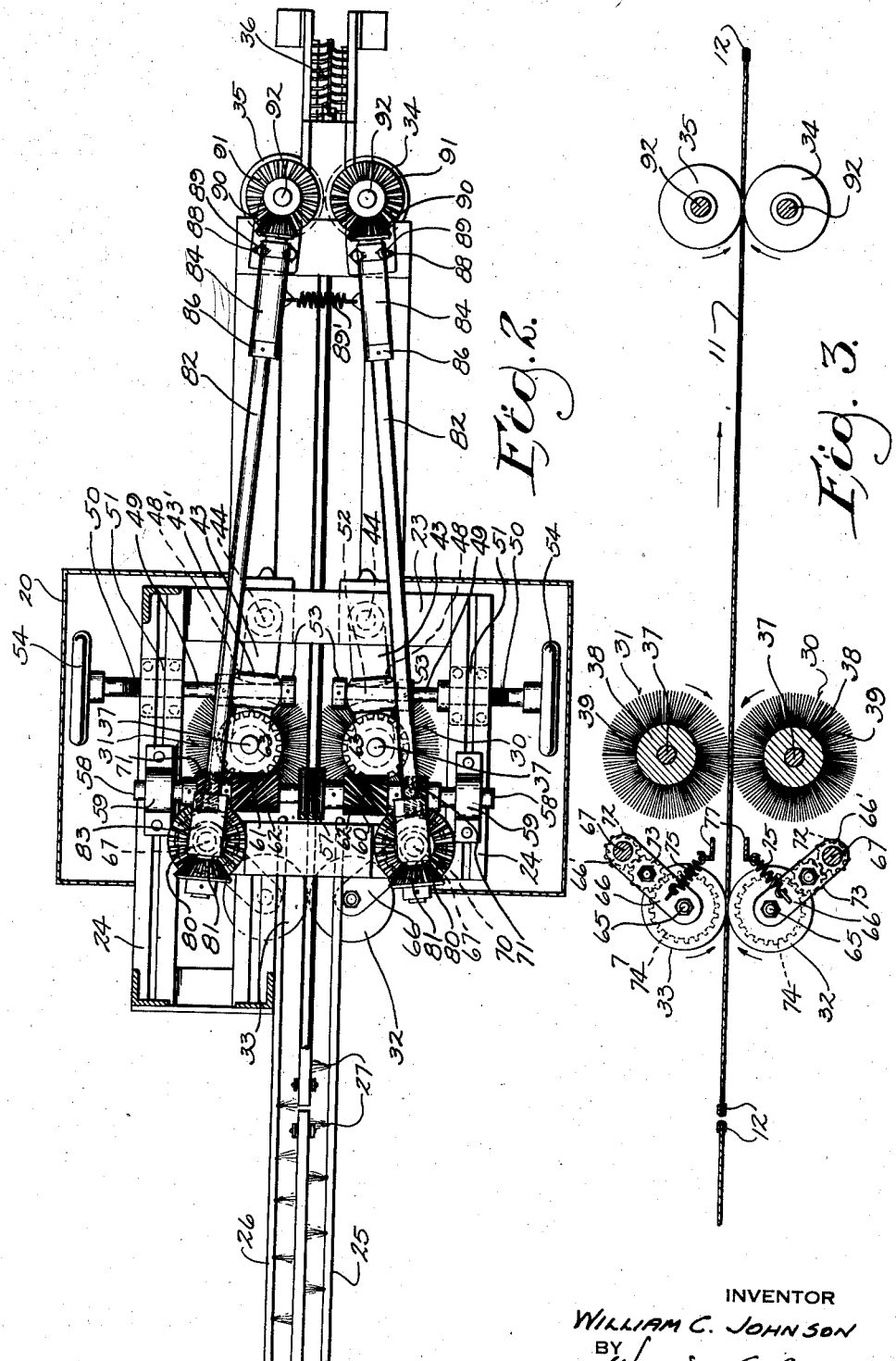

UNITED STATES PATENT OFFICE 2,439,305

MACHINE FOR BRUSHING AND CLEANING PLATES

William C. Johnson, Milwaukee, Wis., assignor to Pfister and Vogal Tanning Company, Milwaukee, Wis., a corporation of Wisconsin Application June 22, 1944, Serial No. 541,564

3 Claims. (Cl. 15—77)

This invention relates to a machine for brushing and cleaning plates and is especially designed and adapted for removing the paste or adhesive from pasting plates utilized in tanneries in the process of manufacturing leather.

In tanneries, skins in a wet, pliable condition are laid upon one surface of the so-called pasting plates, after paste or adhesive has previously been applied to a surface of each skin and the skins then are stretched and smoothed out on the plates so that after the stretching and smoothing operation the skins adhere to the plates in a stretched condition.

The next step in the process is to convey the plates through a drier so as to dry the skins. At the exit end of the drier the skins are peeled off the plates, but the surfaces of the plates to which the skins have been pasted still retain some of the paste or adhesive. To condition the plates for repeated use this adhering paste or adhesive must be removed.

The object of the present invention is to provide a machine which rapidly and efficiently removes the adhering particles of the paste or adhesive from the surfaces of the plates and which accomplishes this while returning the plates to the work room or plate at which the skins are pasted to and stretched on the plates.

Another object of the invention is to provide a machine of this character which, while highly efficient and speedy in operation, requires only the use of two vertical brushes and is further so constructed and organized that the plates are positively fed through the brushes and also through the wipers which are combined with the machine for wiping the plates dry after the paste or adhesive has been removed from the surfaces thereof.

A further object of the invention is to provide a machine having these capacities and advantages and in which provision is made for facilitating the control of the positive feeding means over the plates having regard, particularly, to the larger thickness of the framing or border of the plates with relation to the thickness of the plates proper.

A still further object of the invention is to simplify the power unit utilized for the purpose of rotating the brushes and for driving the feed rolls and also to simplify, compact and adapt the motion transmission means employed between the power unit, the brushes and the feed rolls.

Another object is to provide a machine of this character wherein the brushes are adjustable toward and away from each other and this under positive control so as to insure effective brushing of both surfaces of the plates.

Another and important object of the invention is to provide a machine of this character wherein the portions of the brushes engageable with the opposite surfaces of the plates move in the direction opposite to that in which the plates are moving so as to effect a highly efficient brushing and cleansing action.

These objects of the invention and other ancillary advantages are attained by the mechanism, construction, and arrangement illustrated in the accompanying drawings forming part hereof, in which:

Fig. 1 is a fragmentary view in side elevation illustrating a portion of a pasting plate, cleaning and brushing machine embodying the present invention, the casing of the machine being removed to illustrate the interior mechanism;

Fig. 2 is a fragmentary view partly in section taken on line 2—2 of Fig. 1 and partly in top plan further illustrating the machine shown in Fig. 1 and with the casing only diagrammatically represented;

Fig. 3 is a view in horizontal cross section taken on line 3—3 of Fig. 1 and looking in the direction of the arrows;

Fig. 4 is a view in transverse vertical cross section taken on line 4—4 of Fig. 1 and looking in the direction of the arrows; and Fig. 5 is a diagrammatic view in top plan showing a practical working layout of the working tables for the pasting plates, the drier, the brushing and cleaning machine embodying the present invention, and the connecting trolleys along which the plates travel.

Referring to the drawings and more particularly to Fig. 5 the numeral 10 designates the work tables on which the pasting plates 11 are laid flatwise. The skins or hides, after being de-haired, and de-fleshed and tanned, and while in a soft, wet pliable condition, are laid upon the pasting plates 11, the surfaces of the skins having previously been coated with adhesive or paste. Thereafter the skins are stretched and smoothed out on the plates, and during this process they adhere to the plates. When this operation has been completed the plates 11 with the skins attached thereto are ready for the drier.

Each pasting plate 11 consists of a rectangular board-like structure of suitable composition or other material, bounded by a metallic channel-like frame 12 which is suitably reinforced at its corners as indicated at 13. Attaching clips 14 are suitably secured to the reinforced upper corners of the plates 11. The attaching clips 14 are suspended by hangers 15 equipped with double flanged supporting rollers 16 from a mono-rail 17. The attaching clips 14, hangers 15 and rollers 16 constitute trolleys.

The mono-rail extends from one side of the working tables 10 through the drier D, then back through the machine embodying the present invention, and finally back to the opposite side of the working tables. The mono-rail 17 is branched or doubled through the drier and for this purpose suitable switching arrangements 18 are provided. These switching arrangements per se are no part of the present invention and will not be described in detail.

The cleaning and brushing machine embodying the present invention includes a suitable housing 20. Within the housing an appropriate main frame or supporting structure is provided and is inclusive of a suitable base which may be constituted of heavy angle irons 21 supporting vertical angle irons 22 which are cross connected by angle irons 23 and longitudinally connected by suitable frame members 24. Of course, the frame may be fabricated in any suitable way from metallic structural units of appropriate dimension and cross section.

At the entrance end of the cleaning and brushing machine spray pipes 25 and 26 are provided. These spray pipes have nozzles or jets 27. The pipes are located adjacent the upper ends of the pasting plates and the sprays are directed against the surfaces of the plates so that the cleaning fluid issuing therefrom will trickle down the surface of the plates 11 and moisten these surfaces and the particles of paste or adhesive remaining thereon.

After the plates 11 have been thoroughly moistened with the cleaning fluid they are subjected to a vigorous brushing action. This is accomplished by providing a pair of vertically disposed brushes designated at 30 and 31, the brushes being on the opposite sides of the plates and having the bristles which engage with the plates movable in a direction opposite to the direction of the travel of the plates, thereby enhancing the efficiency of the brushing action.

The pasting plates 11 travel one behind the other along the mono-rail in tandem relation, and after being manually pushed into the machine, come under the control of a pair of feed rollers 32 and 33. These feed rollers are located in advance of the brushes 30 and 31 and positively feed the plates 11 therethrough. Toward the exit end of the machine a second pair of feed rollers designated at 34 and 35 are provided and these propel the plates through the wipers designated generally at 36 and out along the mono-rail back toward the work tables 10.

The brushes 30 and 31 are of identical construction and are similarly supported. Each includes a vertical operating shaft 37 to which the cylindrical body 38 of each brush is secured, the body 38 carrying the bristles 39 of its brush. The lower end of each shaft 37 projects downwardly beyond the body of its brush and its bristles, as illustrated to advantage in Fig. 1. The lower end of each shaft 37 is rotatably supported in the bearing 40 provided at the outer end of a lower swingable brush supporting and adjusting arm 41. Similarly the upper end of the shaft 37 projects well above the upper end of the brush body and its bristles and is rotatably supported in a bearing 42 carried by an upper swingable brush supporting and adjusting arm 43. The brush supporting and adjusting arms 41 and 42 are carried at the lower and upper ends respectively of supporting shafts 44. These shafts are mounted for free turning movement in bearings 45 and 46 in which the lower and upper ends of the shafts 44 are mounted, the bearings 45 and 46 being in turn supported in bearing brackets 47 and 47', carried by structural units of the main frame of the machine.

Means is combined with the upper brush supporting and adjusting arms 43 to move these arms toward and away from each other and to maintain them in any selected adjustment for the purpose of bringing the brushes toward and away from the surfaces of the pasting plates 11 to be brushed.

In carrying out this object each brush supporting and adjusting arm 43 is enlarged, both vertically and horizontally as indicated at 43' in Figs. 1 and 2, and the enlarged portions are provided with transversely aligned openings 48. The cross section of these openings 48 is illustrated in Fig. 2 and as shown, they flare or curve outwardly from their central portions to their ends. An adjusting shaft 49 is provided for each swingable brush supporting and adjusting arm 43. These adjusting shafts 49 have threaded portions 50 threadedly engaged with internally threaded bearings 51 provided on the main frame and have smooth or unthreaded portions 52 extended through the openings 48 of the swingable brush supporting and adjusting arms. The portions of the shafts 49 which extend through the specially shaped internal openings of the brush supporting and adjusting arms 43 have the appropriate rolling or rocking relative engagement with the internal curved peripheral walls thereof. Each shaft 49 is provided on the opposite sides of its brush supporting and adjusting arm with a collar 53 which may be pinned or otherwise suitably fixed thereto so that any axial movement of either adjusting shaft 49 is translated into a swinging movement of its associated brush supporting and adjusting arm and this positively. To facilitate the turning of each of the shafts 49 a hand wheel 54 is fixed to the outer end thereof.

The present invention also proposes to utilize a single motor, preferably an electric motor, for rotating the brushes 30 and 31 and driving the feed rolls 32, 33, 34 and 35. To this end an electric motor 55 is rotatably secured to a superstructure 56 erected on the top of the main frame of the machine. The armature shaft of the electric motor 55 acts through belt and pulley gearing 57 to drive a countershaft 58 rotatably supported in bearings 59, one of which may be conveniently mounted on the superstructure 56 and the other which may be mounted on one of the elements of the main frame as shown to advantage in Fig. 4. The countershaft 58 extends transversely of the machine and is located adjacent to the advance side of the drive shafts 37 of the brushes 30 and 31.

Motion is transmitted from the countershaft 58 to the brush shafts 37 through individual sets or helical gearing designated at 60 and 61. These sets of helical gearing are of identical construction and each includes a driving pinion 62 fixed to the countershaft 58 and meshing with a driven helical gear 63 fixed to the upper end portion of its brush shaft 37. The contour of the intermeshing surfaces of the driving pinions and driven helical gears is such as to provide for effective transmission of the drive from the countershaft 58 to the brush shafts 37 at all times and in all adjustments and yet the relative dimensions are such and such clearance is provided as to allow for the necessary adjustments of the brush shafts 37 obtained by the swinging of their brush supporting and adjusting arms 43.

The feed rolls 32, 33, 34 and 35 are all driven from the countershaft 58 and this in a special manner, and further, they are so driven and supported that they impart a positive feeding drive to the pasting plates 11 with regard to variances in the thicknesses of the borders or of other portions of the plates.

The feed rollers 32 and 33 are fixed to short axles or shafts 65 rotatably supported in bearing openings provided therefor in the outer ends of the upper and lower swingable arms 66 interconnected at their opposite ends by bearing hubs 66' rotatably supported on the lower end portion of vertical shafts 67. Each shaft 67 is supported for rotation though held against vertical movement in bearings 68 provided therefor on the main frame of the machine.

The shafts 67 are driven from the countershaft 58 by means of helical gearing including a helical gear 70 fixed to each shaft 57 and meshing with a driving pinion 71 fixed to the countershaft 58. As shown in Fig. 2 the driving pinions 71 for the feed roll drive shaft 67 are positioned outwardly with respect to the driving pinions 62 of this countershaft which take part in the drive of the brush shafts 37.

The driven helical gears 70 for the feed rolls 32 and 33 are fixed to their shafts 67 adjacent to, but spaced slidably downwardly, from the upper end of such shafts. The lower end of each shaft 67 has a driving spur gear pinion 72 fixed thereto. This driving pinion 72 meshes with an intermediate idler spur gear pinion 73 rotatably mounted on the arms 66 and in turn meshes with a driven spur gear 74 fixed to its feed roller shaft 65. With such a gear train the feed rollers 32 and 33 have their peripheral portions which engage the pasting plates 11 moving in the same direction as the direction of travel of the pasting plates and so advance the pasting plates 11 with which they are engageable to and through the brushes 30 and 31.

The feed rollers 32 and 33 are resiliently forced or pressed toward each other and into consequent driving engagement with the opposite sides of the pasting plates 11. For this purpose a retractile coil spring 75 is combined with the swingable supporting arms 66 of each of the feed rollers 32 and 33. One end of each such spring is connected to one of the arms 66. The opposite end of each spring is attached or anchored to a suitable abutment or spring anchorage such as an angle iron 77 suitably interconnected with structural elements of the main frame.

The power drive for the second set of feed rollers 34 and 35 may be advantageously taken from the shafts 67 and transmitted to the feed rollers 34 and 35 in such a way that these feed rollers 34 and 35 may also be spring pressed into driving engagement with the pasting plates 11.

To accomplish this a beveled driving gear 80 may be fixed to the upper end of each shaft 67. Each beveled driving gear 80 meshes with a driven beveled driving gear 81 fixed to one end of an elongated shaft 82. Each shaft 82 is rotatably mounted adjacent its beveled gear 81 in a bearing 83 rotatably supported on the upper end of its shaft 67. The opposite end of each shaft 82 is rotatably supported in a bearing 84 mounted on a shiftable saddle or bearing block 85. Thrust collars 86 pinned to each shaft 82 and engageable with the ends of its bearing 84 prevent endwise or axial movement of the shaft 82.

Each saddle or slide block 85 is supported for swinging or arcuate movement on a bearing pad 87 mounted on the main frame of the machine. The saddles 85 are provided with arcuate slots 88. Bolts and nuts 89 extend through these slots and through bolt holes in the bearing pads 87 to constrain the saddles 85, the bearings 84 and the shafts 82 to limited swinging movement toward and away from each other.

Beyond each bearing 84 each shaft 82 has a beveled drive pinion 90 fixed thereto and meshing with a driven beveled gear 91 secured to the upper end of a feed roll driving shaft 92. Each feed roll driving shaft is rotatably mounted in vertical sleeve bearings 93 rigidly attached to or integral with its saddle or slide block 85. A retractile coil spring 89' has its ends suitably attached to the bearings 84 and functions to pull these bearings 84, and shafts 82 and the pinions 90 toward each other. The pinions may roll about the beveled driven gears 91 but the bearings 84, when moving toward each other, carry with them the saddles 85 and the bearings 93 for the shafts 92 so that as a consequence the feed rollers 34 are yieldably forced into engagement with the pasting plates.

With a machine constructed and operating in the manner heretofore described the surfaces of the pasting plates are thoroughly and speedily cleansed. The effective action of the machine is attributed to the manner of mounting and rotating the brushes with relation to the movement of the plates and to the way in which the plates are fed or moved through the field of action of the brushes. The brushes are positively driven and are subject to manual control, as to their position, in respect to the surfaces of the plates on which they act. The feed rollers are also positively driven but are yieldably urged or pressed into feeding engagement with the plates so as to drive them through the brushes without impairing the surface characteristics of the plates. In this respect the construction of the feed rollers is of importance in that they are equipped with tires or suitable bands or hoops which surround the rim of the roller and have appropriate resiliency, and capacity for frictional driving contact. The drive for the brushes and feed rolls has also been compacted and simplified in that a single motor serves both the brushes and the feed rolls and in that the drive lines or motion transmission means between the motor, the brushes, and the feed rolls is designed and adapted not only to transmit the requisite torque but also to have the capacity to allow for the adjustment of the brushes and for the yielding pressure application of both the advance and exit feed rollers.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

What I claim is:

1. In a machine for cleaning plates simultaneously on opposite sides thereof including a pair of oppositely related rotary brushes positioned to engage a plate on opposite sides thereof as it passes therebetween, means for adjustably mounting each of said brushes comprising brush supporting and adjusting arms in one end of which a brush is rotatably mounted, said arms at their other ends being carried by a pivotally mounted shaft whereby they swing as a unit about a common axis to provide lateral movement to the brush, a power-driven countershaft, helical gearing between said countershaft and each brush for driving the same and permitting lateral adjustment thereof, and adjusting shafts interengageable with said units and operable to swing the same to selected positions.

2. In a machine for cleaning plates by means of rotary brushes, means for feeding the plate to said brushes comprising a pair of feed rolls adapted to engage a plate therebetween, each of said feed rolls being mounted in a pair of swingable arms, a pair of interconnected drive shafts, said swingable arms being rotatably supported on said drive shafts, connecting gearing between respective drive shafts and rolls, and resilient means for urging the pairs of swingable arms toward each other.

3. In a machine for simultaneously cleaning opposite sides of plates by means of oppositely positioned rotary brushes, the longitudinal axes of which are substantially vertical means for simultaneously driving said brushes while permitting lateral adjustment thereof comprising a substantially horizontally mounted power-driven counter-shaft having helical driving pinions mounted thereon, helical driven gears intermeshing with said pinions, each such driven gear being mounted on a respective rotary brush to provide rotary motion thereto and having its longitudinal axis substantially vertical, the helical driving pinions being longer axially than the helical driven gears to permit movement of said helical driven gears with respect to said driving pinions to accomplish said lateral adjustment of said rolls and brushes.

WILLIAM C. JOHNSON.

REFERENCES CITED

The following references are of record in the file of this patent:

UNITED STATES PATENTS

| Number | Name | Date |
|---|---|---|
| 1,219,545 | Gilbertson | Mar. 20, 1917 |
| 1,381,337 | Rippe | June 14, 1921 |
| 1,687,201 | Hagen | Oct. 9, 1928 |
| 1,817,332 | Worrall | Aug. 4, 1931 |
| 1,895,934 | Leyland | Jan. 31, 1933 |
| 2,218,913 | Hughes et al. | Oct. 22, 1940 |
| 2,269,807 | Buckley | Jan. 13, 1942 |
| 2,291,553 | Matby et al. | July 28, 1942 |
| 2,313,606 | Webb et al. | Mar. 9, 1943 |